Nov. 5, 1963    H. E. BRYS    3,109,966
SIGNAL IMPULSE INTEGRATOR WITH VARIABLE TIME DELAY
Filed June 19, 1958    2 Sheets-Sheet 1
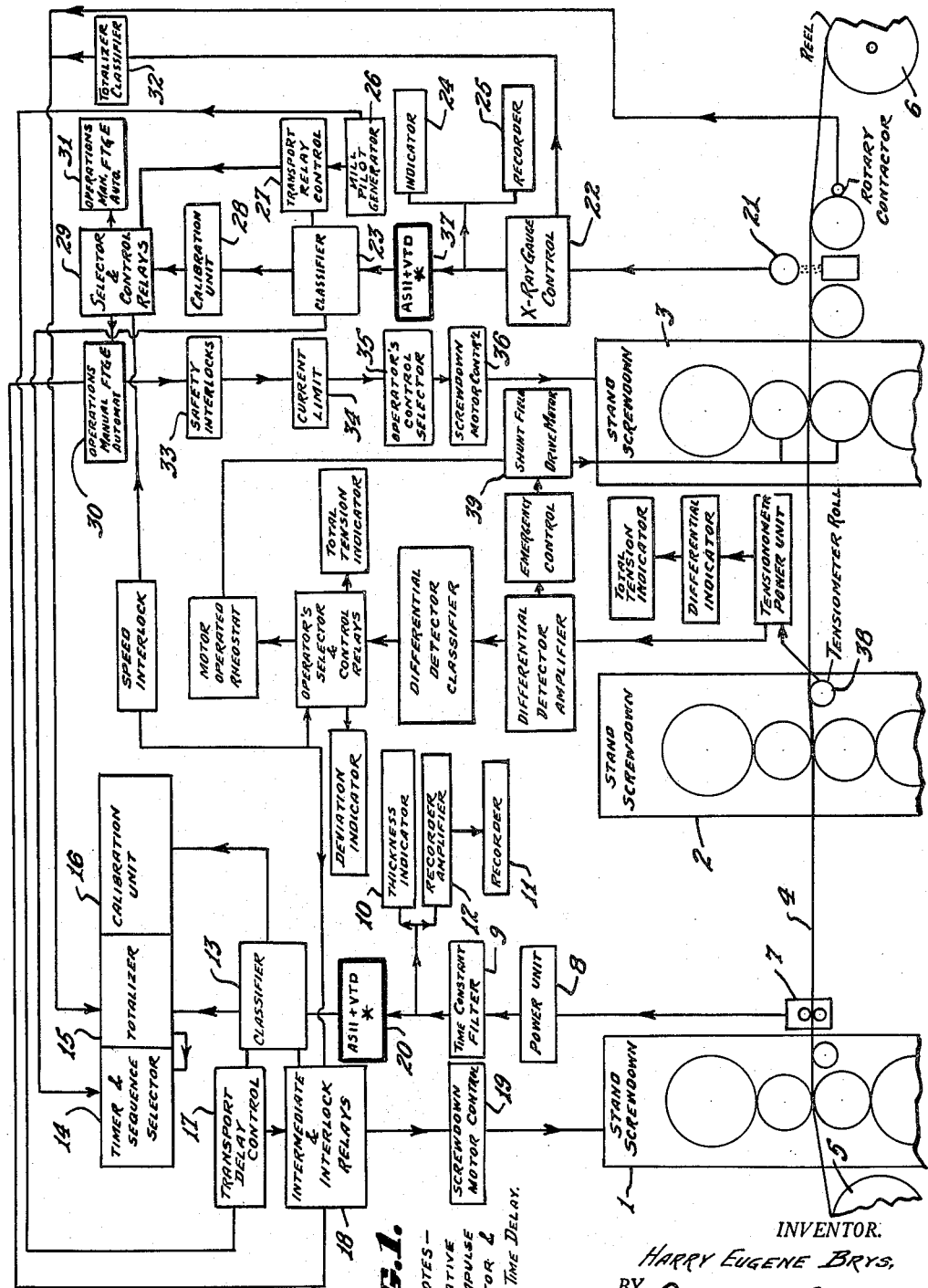
FIG. 1.
\* DENOTES —
ACCUMULATIVE
SIGNAL IMPULSE
INTEGRATOR &
VARIABLE TIME DELAY.
INVENTOR.
HARRY EUGENE BRYS,
BY 
ATTORNEYS.

Nov. 5, 1963 H. E. BRYS 3,109,966
SIGNAL IMPULSE INTEGRATOR WITH VARIABLE TIME DELAY
Filed June 19, 1958 2 Sheets-Sheet 2

INVENTOR.
HARRY EUGENE BRYS,
BY Allen + Allen
ATTORNEYS.

United States Patent Office 3,109,966
Patented Nov. 5, 1963

3,109,966
SIGNAL IMPULSE INTEGRATOR WITH VARIABLE TIME DELAY
Harry Eugene Brys, Butler, Pa., assignor to Armco Steel Corporation, Middletown, Ohio, a corporation of Ohio
Filed June 19, 1958, Ser. No. 743,187
9 Claims. (Cl. 317—157)

The invention relates to systems in which operations are performed on a continuous strand, web, or series of articles, which operations affect a quality or characteristic of the material being treated, and in which measurement is made of the quality or characteristic, on the basis of which the operations are controlled or varied to the end of maintaining the quality or characteristic constant. While the invention is of wide application, it will be described herein in an exemplary embodiment having to do with the rolling of metal strip—the quality or characteristic measured being the gauge of the material. It will be seen that this embodiment is illustrative and not limiting, since the invention is applicable generally to all manufacturing procedures in which a charatceristic of a material is measured in such a way as to produce a series of signals or electrical impulses varying in sign, magnitude and duration in accordance with departures of the material from a pre-selected norm, and in which the operating instrumentalities are controlled in accordance with such signals. Those skilled in the art will understand the application of the present invention to situations in which fluctuating, variable-length repetitive signals are employed in the field of automation, in the light of the teachings herein.

The actuation of automatic controllers by short-duration impulses which exceed a selected threshold value is not desirable, because it produces over-action and hunting. The correction brought about by one impulse tends to occur before the correction produced by a preceding impulse has been evaluated. Although it has hitherto been suggested to insert a time delay in the system, this has not eliminated the disadvantage. Further, present systems fail to take into account a series of small deviations in one direction, and unnecessarily correct when a large signal of short duration is produced, as would be the case, for example, if a weld passed the measuring point.

A skilled operator, watching a pointer on an indicator in a rolling operation, can satisfactorily control gauge, because he mentally integrates successive small gauge variations. The fatigue produced by doing this over a work-turn is, however, very great.

It is an object of the invention to provide a system which eliminates the disadvantages set forth above.

It is an object of the invention to provide a means for automatically integrating signal impulses.

It is an object of the invention to provide in connection therewith means having variable time delay characteristics responsive to the integrated signals.

It is an object of the invention to provide means for clearing the integrator when a corrective impulse has been produced.

It is an object of the invention to provide a control means superior in operation to manual control, because of faster reaction rate and more accurate integration.

These principal objects and other objects of the invention which will be set forth hereinafter or will be apparent to one skilled in the art upon reading these specifications are accomplished by that procedure and by that construction and arrangement of parts of which the aforesaid exemplary embodiment will now be described. Reference is made to the accompanying drawings, wherein:

FIGURE 1 is a block diagram showing the application of control devices to the exemplary embodiment, namely a tandem stand of cold mills, and indicating the place of the signal impulse integrator of this invention in the apparatus assembly.

Figure 3:
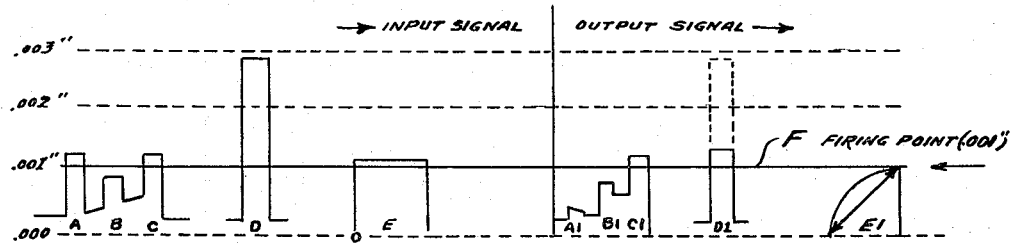
FIGURE 3 is a chart showing the effect of signal impulses.

The signal integrator of this invention can be manufactured as a separate unit and attached to existing control apparatus, or it may be built into such apparatus as will be readily understood by the skilled worker in the art.

In FIGURE 1 there is shown a train of tandem four-high cold mills 1, 2 and 3 operating to reduce a metal strip 4 which is withdrawn from a payoff reel 5 and coiled on a take-up reel 6. The train may contain more or fewer mills as desired.

Adjacent the mill 1 there is indicated at 7 a thickness measuring device adapted to produce electrical signals in accordance with variations in the gauge of the work piece 4. This device may be of any suitable form and structure. In one embodiment the thickness gauge is a differential transformer or microformer which emits a signal from its secondary winding, the strength of the signal being related to the position of a movable core which in turn is governed by the strip thickness. The normal or desired thickness is set on a gauge by the operator at the beginning of a rolling operation.

Power is supplied to the thickness gauge by a power unit 8. A time constant filter 9 slows the electrical pulses so as to dampen the signal visible to the operator on a thickness indicator 10. There may also be a signal recorder 11 fed through a recorder amplifier 12.

The signal is fed to a classifier 13 which is a controller comprising electronic components, relays, and the like. Its essential function is to energize the controls which start the screwdown motors of the mill 1 when the signal reaches a pre-set value. A time and sequence selector 14 permits the operator to measure the operating time of each component. A totalizer 15 indicates the number of feet of strip rolled, the footage on gauge, the footage over gauge in both directions and the footage not gauged. A calibration unit 16 enables the operator to check the calibration of the circuit by substituting a standard signal.

There is normally a transport delay control 17 which suspends the control operation for a brief time after the screwdown motor has stopped running. This prevents that hunting which would be caused if the uncorrected strip lying between the mill 1 and the gauge 7 were to be measured.

A series of intermediate and interlock relays is indicated at 18. These devices are so connected into the various circuits as to prevent automatic operation under various circumstances. For example automatic control cannot be tolerated when the gauge is off the strip, or when a camber correction is being made by operating a screwdown motor on one side only of the mill.

The control impulses are finally made effective on the mill screwdown motors (not shown) through a screwdown motor control 19. The system thus far described is conventional and its elements are known in the art; but it exhibits the disadvantages heretofore outlined. These disadvantages are overcome by the use of the automatic signal impulse integrator of this invention, indicated in the diagram by the block 20 and hereinafter described.

As an indication that the invention here is not confined to the use of any one means for measuring the variable quality of the material being operated upon or to any one system of controls, mill stand number 3 is equipped with an X-ray gauge measuring device 21 of known type, coupled to a gauge control 22 which feeds the classifier 23. As before there is an indicator 24 and a recorder 25. A mill pilot generator 26 may be employed to vary the transport delay in proportion to the speed of the strip. This is coupled to a transport delay control apparatus 27. A calibration unit is provided at 28 feeding selector and control relays 29 actuating measuring devices 30 and 31 for footages. There is a totalizer classifier at 32.

The block marked 33 indicates apparatus operating to lock out the controls when the X-ray gauge is off the strip. A current limit device 34 locks out the screwdown motor on the mill stand 3 when the current demand for the motor driving the rolls exceeds a safe limit. The operator may control the screwdown manually at any time through an operator's control selector 35. The screwdown motor control is indicated at 36.

The assembly thus far described in connection with stand number 3 is again conventional and presents the disadvantages hereinabove recited. These disadvantages are overcome by the inclusion in the system of the automatic signal impulse integrator of this invention, indicated by the block 37.

In order to make a complete showing, mill stand number 2 is indicated in FIGURE 1 as provided with a tension measuring gauge 38 which through suitable electrical apparatus controls the speed of the drive motor 39 of the mill stand 3. The electrical apparatus is indicated by labelled blocks and does not require description here. The various control systems are tied together as indicated in the diagram, and as conventional in the art.

Figure 2:
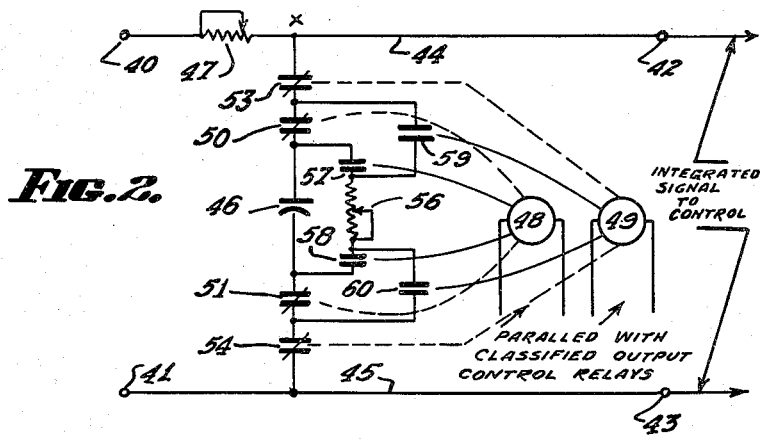
FIGURE 2 is a simplified wiring diagram of the signal integrator.

Turning now to FIGURE 2 there is shown in a simplified fashion a circuit diagram for the automatic signal impulse integrator with variable time delay of the present invention. Input terminals 40 and 41 are shown as connected to output terminals 42 and 43 by leads 44 and 45. A capacitor 46 is shown connected in shunt across these leads. The lead 44 is shown as including a potentiometer 47 on the input side. The capacitor and the potentiometer constitute a time delay circuit, and it will be understood that a signal received at the input terminals 40 and 41 will not reach the output terminals 42 and 43 in strength until the capacitor 46 has been charged to a given value.

If the signal is of sufficient magnitude (i.e. above a pre-selected threshold value) but is of insufficient duration to warrant controller action, the time constant of the potentiometer-capacitor combination will prevent the signal from reaching the terminals 42 and 43 with sufficient magnitude to operate a controller connected to those terminals. At the same time, the signal impulse is not entirely lost because the capacitor 46 tends to hold the signal. It tends also to accumulate successive, short duration signal impulses so that the time delay will decrease as the signal impulse time lengthens. If a signal of large magnitude should occur, the time delay will still further decrease, permitting a fast, responsive controller action. The greater the magnitude of the error signal, the shorter will be the time delay involved, and consequently the faster the response of the controller. Successive signals of opposite sign will tend to cancel each other in the capacitor 46. Thus at the start of an operation, a time delay circuit has an effect not only in preventing over-control and hunting because of short duration pulses above the threshold value, but also in integrating successive pulses which, while they do not directly affect the controller, nevertheless affect the duration of the time delay. The circuit thus far described cannot continue to function in this manner, however, unless provision is made to remove the capacitor from the circuit and discharge it. If this is not done, the actuating signal may be of excessive duration, and succeeding signals may be affected by preceding signals in such a way as to make integration impossible. This invention embodies means whereby the time delay capacitor is periodically discharged to allow the circuit to return to a null point, tolerance or zero condition. This is arranged to occur whenever a signal reaches the output terminals 42 and 43 of sufficient magnitude to initiate a corrective action.

In FIG. 1 the automatic signal impulse integrator of this invention is shown in the left-hand system connected between the time constant filter 9 and the classifier 13. If a signal over threshold value reaches the classifier 13, one or the other (depending on the sign of the signal) of a pair of relays in the classifier will be actuated to initiate corrective operation of the mill screwdown motors. In the automatic signal impulse integrator of this invention, a similar pair of relays is provided. The actuating coils of these relays are indicated at 48 and 49, and these coils are connected in parallel with the coils of the aforesaid relays in the classifier. Relay 48 has normally closed contacts 50 and 51 and normally open contacts 57 and 58. Relay 49 has normally closed contacts 53 and 54 and normally open contacts 59 and 60. The normally open contacts of these relays are located in parallel in a circuit in shunt to the capacitor 46, which circuit contains a resistor or potentiometer 56. If now a signal reaches the output terminals 42 and 43 of sufficient magnitude to initiate a control operation in the classifier, either relay 48 or 49 will be actuated, depending upon the sign of the signal. If relay 48 is actuated, the capacitor 46 will be isolated from the leads 44 and 45 by the opening of the contacts 50 and 51, and at the same time the resistor 56 will be connected across the capacitor 46 so as to discharge it. Similarly if relay coil 49 is energized, contacts 53 and 54 will be opened, and contacts 59 and 60 closed, with the same result. When the control operation is concluded, the energizing relay in the classifier will be de-energized, resulting in the de-energization of the corresponding relay in the automatic signal impulse integrator. The normally closed contacts will again close, and the normally open contacts will again open, and the apparatus will be reset with the capacitor 46 in either fully discharged condition or discharged to a predetermined degree. The time constant of discharge of the capacitor 46 can be adjusted by means of the potentiometer 56. Now the apparatus is reset for operation as an integrator with variable time delay during the ensuing cycle.

The mode of operation of the device can be explained as follows: a balanced or single ended D.C. signal from a thickness gauge (or other source) is received at the terminals 40 and 41. Before such a signal can reach the terminals 42 and 43 it must pass through the resistor 47 and charge the capacitor 46. The incoming signal can reach the output terminals at its original magnitude only after the capacitor is fully charged. A repetitive signal is illustrated in FIGURE 3 at A, B and C. Signal A is shown as over the threshold potential indicated by line F. Normally it would fire the classifier control; but since the signal is shown as of short duration, and because of the time constant of the resistor 47 and capacitor 46, it will appear at the output terminals 42 and 43 as a signal A1 which does not reach the firing potential. The capacitor 46, however, retains a charge produced by the signal. In the meantime a signal B showing a trend toward the same error, but of less than threshold potential, arrives at the output terminals with a value B1 which is not sufficient to initiate a correction operation. By reason of the charge on the capacitor 46 the time delay is now very short. Consequently another signal C which shows error in the same direction and is of the threshold value may appear at the output terminals 42 and 43 as a signal C1 sufficient to initiate a corrective operation. While the corrective operation has been indicated as occurring after three signal impulses, it will be understood that, depending on the magnitude and sign of the signals reaching the input terminals, more or fewer signals may be involved in a single corrective cycle.

On the other hand, a signal D, being large, may produce a signal D1 which is above the threshold potential, but this will occur only if the signal D is of sufficient duration to overcome the time constant of the resistor-capacitor combination 47, 46 as affected by any resident charge on the capacitor. If the capacitor 46 were allowed to remain in the circuit at all times, the result would be a retention of the control signal at terminals 42 and 43 even though the signal at terminals 1 and 2 might be zero or reversed. The removal of the capacitor from the circuit and the discharging of it through the potentiometer 56 resets the signal integrator and the variable time delay. If desired, means may be provided to inject a sustained signal E at intervals for calibration purposes or to establish a desired point on a curve. This signal may originate with the calibration unit 16.

Figure 4:
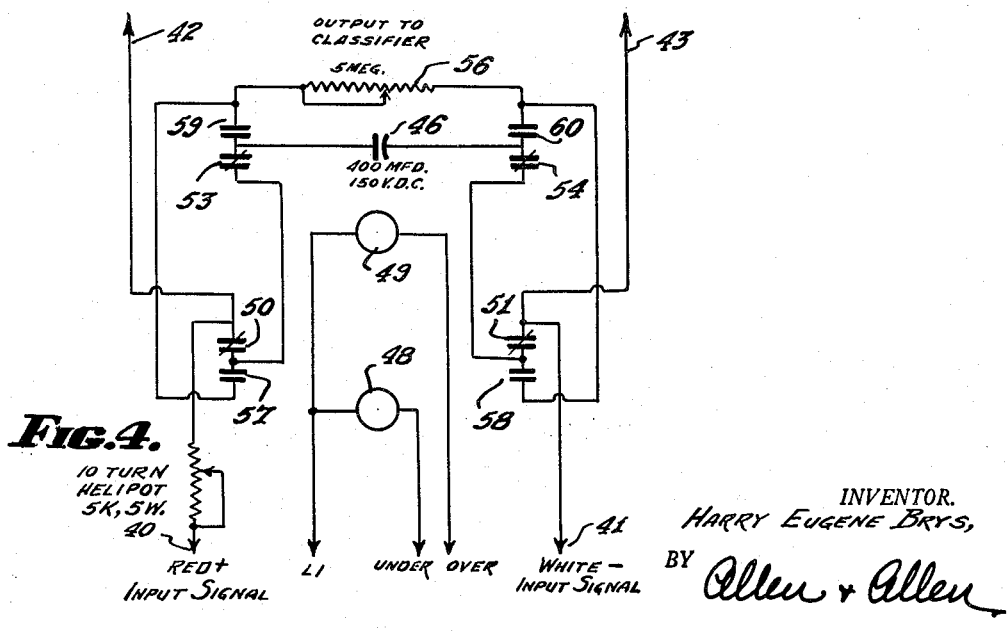
FIGURE 4 is a wiring diagram of a signal integrator in actual use.

An actual wiring diagram is shown in FIGURE 4 where like parts have been given like index numerals and need not be re-described. In this diagram the relay having coil 49 is shown as having two normally closed contacts 53 and 54 and two normally open contacts 59 and 60, while the relay having coil 48 is shown as having two normally closed contacts 50 and 51 and two normally open contacts 57 and 58. The circuit of FIGURE 4 employs double pole double throw relays which are economical, although any other means for discharging the capacitor may be substituted.

The accumulative signal impulse integrator of this invention has many advantages over equipment merely embodying electrical, mechanical or pneumatic time delays. The repetition of an error signal is not lost, but tends to accumulate in the capacitor, varying the time of response of the system. Thus the time delay is not fixed, but varies in accordance with the amount of error. Not only is hunting prevented, but wear on the controller is saved. The controller unit can be set or adjusted. This is not possible with intermediate pre-set fixed time delays. By varying the time delay, which may be accomplished through adjustment of the potentiometer 47, the response of the apparatus can be made either more or less sensitive. The apparatus truly integrates a series of received signals.

Modifications may be made in the invention without departing from the spirit of it. The invention having been described in an exemplary embodiment, what is claimed as new and desired to be secured by Letters Patent is:

I claim:

1. In control means for apparatus operating on a material so as to change a characteristic of it, wherein the control means includes means for measuring the said characteristic and for providing electrical impulses of either sign upon the departure of said characteristic from a norm in either direction, and means actuated thereby for correcting the operation of the apparatus, a signal impulse integrator comprising a resistor-capacitor time delay circuit acting to absorb said impulses of either sign in the charging and discharging of said capacitor until a threshold charge of either sign is attained, whereupon a corrective action is initiated, and means acting upon the initiation of said corrective action to discharge said capacitor to a value below said threshold charge value.

2. In control means for apparatus operating on a material so as to change a characteristic of it, wherein the control means includes means for measuring the said characteristic and for providing electrical impulses of either sign upon the departure of said characteristic from a norm in either direction, and means actuated thereby for initiating a correction of the operation of the apparatus, a signal impulse integrator comprising input and output terminals, leads respectively connecting said terminals, one of said leads containing a resistor, a capacitor in shunt to said leads forming with said resistor a time delay circuit acting to absorb said impulses of either sign in the charging and discharging of said capacitor until a threshold charge of either sign is attained, a circuit in shunt to said capacitor and containing a resistor, and means actuated by the initiating means for said corrective action to isolate said capacitor from said leads and to close said circuit in shunt to said capacitor whereby to discharge said capacitor to a value below said threshold value.

3. The structure claimed in claim 2 wherein said first mentioned resistor is a potentiometer.

4. The apparatus claimed in claim 2, wherein said electrical impulses include impulses of opposite sign depending upon the direction of the departure of the said characteristic from the said norm, and wherein the initiation of a corrective action in either direction will provide for the discharge of said capacitor.

5. The apparatus claimed in claim 2, wherein the said electrical impulses energize a relay, said relay having contacts for isolating said capacitor and for closing said circuit in shunt to said capacitor.

6. The apparatus claimed in claim 2, wherein said electrical impulses include impulses of opposite sign depending upon the direction of the departure of the said characteristic from the said norm, and wherein the initiation of a corrective action in either direction will provide for the discharge of said capacitor, and in which the said electrical impulses actuate, depending upon their direction, one of a pair of relays, each relay having contacts for isolating said capacitor and for closing said circuit in shunt to said capacitor.

7. In control means for apparatus operating on a material so as to change a characteristic of it, wherein the control means includes means for measuring the said characteristic and for providing electrical impulses of differing sign upon the departure of said characteristic from a norm in either direction, and means including alternately acting relays for correcting the operation of the apparatus in either direction, a signal impulse integrator comprising input and output terminals, leads respectively connecting said terminals, one of said leads containing a resistor, a capacitor in shunt across said leads and forming with said resistor a time delay circuit acting to absorb said impulses in the charging of said capacitor until a threshold charge is attained, and a pair of relays, each of said relays having normally closed contacts acting when opened to isolate said capacitor from said leads, and normally open contacts in said shunt circuit, said last mentioned relays being connected respectively for actuation with said first mentioned relays, whereby upon the initiation of a corrective action in either direction, said capacitor will be isolated from said leads and caused to discharge through said shunt circuit.

8. A signal impulse integrator adapted for use in control means for correcting the operation of apparatus and comprising input and output terminals, leads respectively connecting said terminals, one of said leads containing a resistor, a capacitor in shunt across said leads, a resistor in a shunt circuit across said capacitor, and two relays, said relays having normally closed contacts located in the circuit of said capacitor so as to isolate it from said leads and normally open contacts located in the shunt circuit around said capacitor, said relays responsive to impulses of opposite sign, and terminals from said relays adapted to be connected into the circuit for the means for correcting the operation of said apparatus.

9. The structure claimed in claim 8 in which both of said resistors are adjustable.

References Cited in the file of this patent

UNITED STATES PATENTS

| | | |
|---|---|---|
| 2,114,016 | Dimond | Apr. 12, 1938 |
| 2,272,998 | Bjornson | Feb. 10, 1942 |
| 2,379,262 | Terry | June 26, 1945 |
| 2,466,689 | Curtis | Apr. 12, 1949 |
| 2,530,749 | Yardeny | Nov. 21, 1950 |
| 2,567,928 | Farmer | Sept. 18, 1951 |
| 2,772,378 | Farkas | Nov. 27, 1956 |
| 2,813,985 | Scorgie | Nov. 19, 1957 |
| 2,925,535 | Titze | Feb. 16, 1960 |